(12) United States Patent
Van Swearingen

(10) Patent No.: US 7,607,942 B1
(45) Date of Patent: Oct. 27, 2009

(54) MULTI-SHOT COAXIAL CONNECTOR AND METHOD OF MANUFACTURE

(75) Inventor: Kendrick Van Swearingen, Woodridge, IL (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 12/191,922

(22) Filed: Aug. 14, 2008

(51) Int. Cl.
H01R 9/05 (2006.01)
(52) U.S. Cl. .............................. 439/578; 29/828; 29/856
(58) Field of Classification Search ................. 439/578; 29/828, 858, 860, 856, 883
See application file for complete search history.

(56) References Cited

U.S. PATENT DOCUMENTS

| | | | |
|---|---|---|---|
| 5,354,217 | A | 10/1994 | Gabel et al. |
| 7,025,246 | B2 * | 4/2006 | Wild et al. ................... 228/175 |
| 7,217,154 | B2 * | 5/2007 | Harwath ...................... 439/578 |
| 7,249,969 | B2 * | 7/2007 | Paynter ........................ 439/578 |
| 7,275,957 | B1 | 10/2007 | Wlos et al. |
| 7,419,403 | B1 * | 9/2008 | Paynter ........................ 439/578 |
| 7,517,258 | B1 * | 4/2009 | Taylor ......................... 439/736 |
| 7,520,779 | B2 * | 4/2009 | Arnaud et al. ............... 439/578 |
| 2006/0199431 | A1 * | 9/2006 | Paynter ........................ 439/578 |
| 2007/0087626 | A1 * | 4/2007 | Harwath ...................... 439/578 |
| 2007/0190854 | A1 * | 8/2007 | Harwath ...................... 439/578 |
| 2007/0224880 | A1 * | 9/2007 | Wlos et al. ................... 439/578 |
| 2008/0170346 | A1 * | 7/2008 | Van Swearingen ........... 361/119 |
| 2008/0194142 | A1 | 8/2008 | Wlos et al. |
| 2008/0261446 | A1 * | 10/2008 | Arnaud et al. ............... 439/578 |

* cited by examiner

*Primary Examiner*—Ross N Gushi
(74) *Attorney, Agent, or Firm*—Babcock IP, PLLC

(57) ABSTRACT

A coaxial cable connector formed via multi-shot injection molding has a body formed by multiple injection molding layers of different injection moldable materials about a central inner contact to form an integral connector body. The connector body is provided with a coaxial dielectric spacer of dielectric polymer surrounding the inner contact; a coaxial inner body of injectable molded metal composition surrounding an outer diameter of the dielectric spacer; and an outer body of polymer surrounding the inner body. A range of different coupling bodies compatible with the connector body may also be formed via injection molding to provide connectors compatible with a range of different coaxial cable configurations.

20 Claims, 10 Drawing Sheets

US 7,607,942 B1

MULTI-SHOT COAXIAL CONNECTOR AND METHOD OF MANUFACTURE

BACKGROUND OF THE INVENTION

1. Field of the Invention

The invention relates to an electrical connector. More particularly the invention relates to a lightweight and cost efficient electrical connector for coaxial cable with significant material and manufacturing efficiencies realized by application of multi-shot injection molding technology.

2. Description of Related Art

Connectors for coaxial cable are typically manufactured via precision machining of a plurality of metal and dielectric elements that are then assembled to form the connector assembly.

Machining of metal elements from metal bar stock typically results in significant material waste and requires sophisticated high precision machining/turning equipment and skilled operators for same.

A previous application of polymeric materials to a coaxial connector for use with helical corrugated solid outer conductor coaxial cable is disclosed in U.S. Pat. No. 5,354,217, issued Oct. 11, 1994 to Gabel et al. Polymeric materials are applied to both the connector body and a clamp nut, requiring multiple machined internal conductive elements to form a conductive path for the outer conductor across the connector. However, the separate metal and polymeric elements must each be separately formed, any flashing removed or other rework performed and each of the separate elements assembled together by labor intensive press fit and/or hand assembly operations to complete the connector assembly. Manufacture, quality control, inventory and delivery coordination to the assembly area of each of the plurality of separate elements is a significant additional manufacturing cost. Further, a problem resulting in a delivery delay of any one of the multiple separate elements and or damage or loss during field assembly renders the remainder of the connector inoperable.

In U.S. Pat. No. 5,354,217, the clamp nut threads upon helical corrugations of the outer conductor and the leading edge of the outer conductor is then manually precision-flared against the clamp nut prior to connector assembly. Therefore, the connector is incompatible with smooth or annular corrugated solid outer conductor coaxial cable, is expensive to manufacture and time consuming to install.

Competition within the cable and connector industry has increased the importance of minimizing connector weight, installation time, materials waste, overall number of discrete connector parts and connector manufacturing/materials costs. Also, competition has focused attention upon ease of use, electrical interconnection quality and connector reliability.

Therefore, it is an object of the invention to provide an electrical connector and method of manufacture that overcomes deficiencies in such prior art.

BRIEF DESCRIPTION OF THE DRAWINGS

The accompanying drawings, which are incorporated in and constitute a part of this specification, illustrate embodiments of the invention, together with a general description of the invention given above, and the detailed description of the embodiments given below, serve to explain the principles of the invention. Like reference numbers in the drawing figures refer to the same feature or element and may not be described in detail for every drawing figure in which they appear.

DETAILED DESCRIPTION

The inventor has recognized that injection moldable metal compositions, usable with conventional polymeric injection molding equipment, enables manufacture of multi-shot combination metal and polymeric material connector assemblies. Thereby, numerous manufacturing steps and the prior need for additional seals between separate elements may be eliminated to realize a significant materials and manufacturing cost savings.

An example of an injection moldable metal composition is "Xyloy"™ M950 available from Cool Poly, Inc. of Warwick, R.I., US. "Xyloy"™ M950 comprises an aluminum and zinc composition delivered in pellet form to injection molding equipment in the same manner as raw polymer pellets. Because the melting point of zinc is comparatively low, a combination of aluminum and zinc results in an alloy with a low enough melting point and viscosity characteristics suitable for use in polymeric injection molding machines without requiring any modification thereto. Other suitable injection moldable metal compositions preferably have melting points and viscosity characteristics that similarly enable use of conventional polymeric injection molding equipment with maximum operating temperatures around 1100 degrees Fahrenheit. Injection moldable metal compositions as described herein above do not require specialized metal injection molding "MIM" equipment, which relies upon application of higher temperatures and/or pressure incompatible with traditional injection moldable polymers to fluidize a metal alloy, such as thixotropic magnesium alloy(s).

Figure 1:
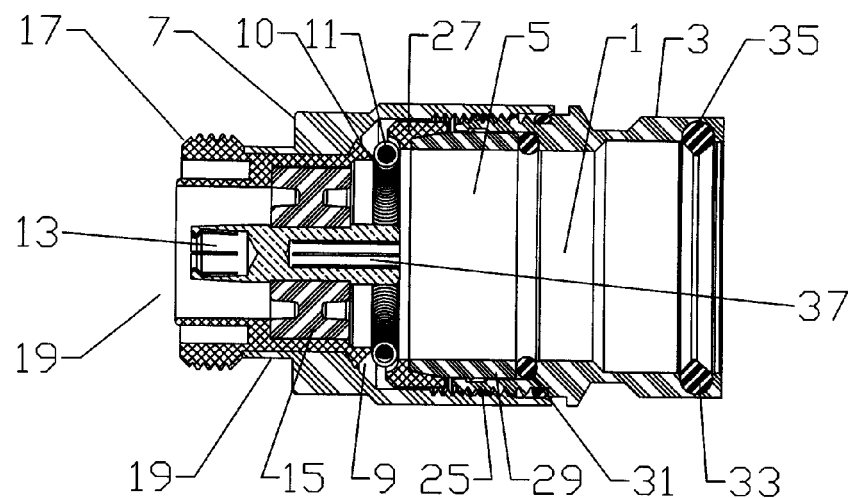
FIG. 1 is a schematic cut-away side view of a first exemplary embodiment.
Figure 2:
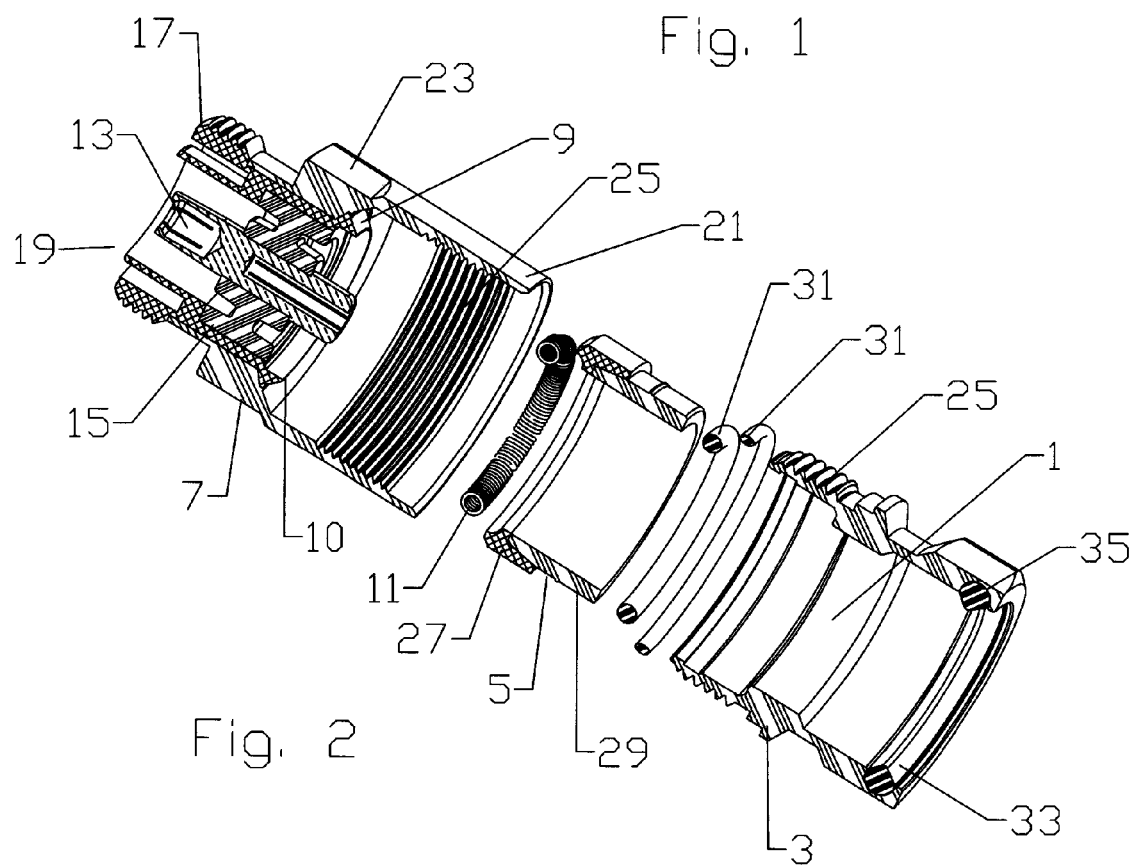
FIG. 2 is a schematic isometric exploded cut-away side view of FIG. 1.
Figure 3:
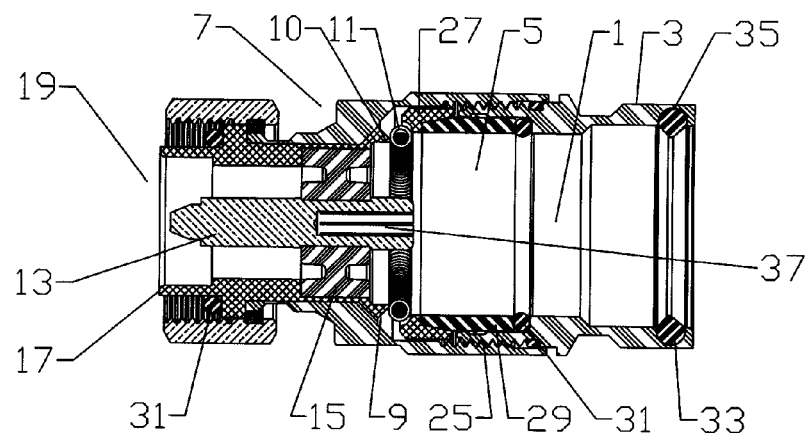
FIG. 3 is a schematic cut-away side view of a second exemplary embodiment.
Figure 4:
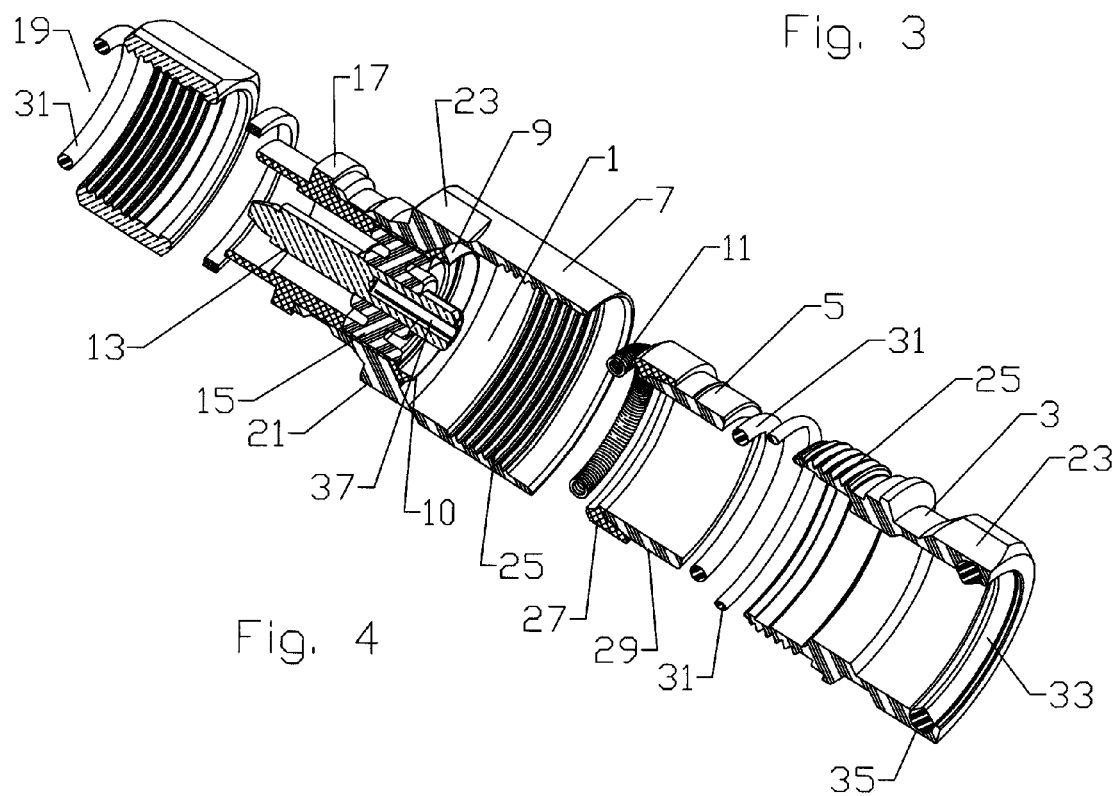
FIG. 4 is a schematic isometric exploded cut-away side view of FIG. 3.

Exemplary embodiments of coaxial connectors configured for connection to annular corrugated solid outer conductor coaxial cable are shown in FIGS. 1-4. FIGS. 1 and 2 demonstrate a connector configured for the 7-16 DIN Female standard connection interface and FIGS. 3 and 4 demonstrate a connector configured for the 7-16 DIN Male standard connection interface. One skilled in the art will appreciate that any desired standard or proprietary connection interface may be applied. Similarly, alternative cable attachment mechanisms, well known in the art, for example suitable for straight wall or helically corrugated outer conductor coaxial cable, may be applied.

In the exemplary embodiment in FIGS. 1-4, the connector is configured for use with annular corrugated outer conductor coaxial cable (not shown). The cable is received through a bore 1 of a coupling body 3, a slip ring 5 and the connector body 7. A leading edge of the outer conductor is retained clamped between an annular ramp surface 9 formed on an end face 10 of an inner body 17 of the connector body 7 and a clamp spring 11, such as a canted coil spring. The clamp spring 11 is pressed against the outer surface of the leading edge by the slip ring 5 driven by the coupling body 3. The slip ring 5 is rotatable independent of the coupling body 3, to minimize the chance for damage to the clamp spring 11 during rotation of the coupling body 3 to thread the coupling body 3 upon the connector body 7, thus applying the clamping force to the leading edge of the outer conductor. An inner conductor of the coaxial cable is received into an inner contact 13 held coaxial within the bore 1 by a dielectric insulator 15.

To minimize metal material costs and the overall weight of the connector, a metal inner body 17 is provided as an outer conductor conductive path between the annular ramp surface 9 and the connection interface 19. A polymeric outer body 21 surrounds the inner body 17 and may include, for example, tool flats 23 for use during connector assembly and or mating threads 25 for the coupling body 3.

The slip ring 5 spring mating surface 27 with the clamp spring 11 may be formed of metal, to avoid polymeric material creep that may occur over time which could prevent easy separation of the clamp spring 11 from the split ring 5 when removed, for example, for periodic inspections of the cable and connector interconnection. A cylindrical slip ring body 29 that maintains coaxial alignment of the slip ring 5 with the coaxial cable may be formed from polymeric material.

Because it is outside of the electrical path, the coupling body 3 may be formed entirely from polymeric material.

Environmental sealing of the connector may be improved by applying environmental seal(s) 31 such as gasket(s) and/or o-rings between the outer conductor and the connector, for example positioned between the slip ring 5 and the coupling body 3 and/or between the connector body 7 and the coupling body 3. A further sheath seal 33, sealing between the coupling body 3 and an outer sheath of the cable may be formed in place upon an outer surface of the coupling body 3 bore 1, for example molded into an annular groove 35. Compared to a conventional o-ring type seal inserted into an annular groove 35, an environmental seal formed in place has a significantly reduced chance for failure and/or assembly omission/error, as the potential leak path between the o-ring and the annular groove 35 and the potential for o-ring slippage out of the annular groove 35 is eliminated.

Although the inner contact 13 may be similarly manufactured by molding, a conventionally machined inner contact 13 is preferred to enable use of beryllium copper and or phosphor bronze alloys with suitable mechanical characteristics for spring finger and/or spring basket 37 features of the inner contact 13 that receive and retain the inner conductor of the cable and/or of the inner conductor mating portions of the mating connector at the connection interface 19.

As used herein, multi-shot injection molding is understood to be an injection molding manufacturing procedure wherein additional layers are injection molded upon a base element and/or prior injection molded layers. Preferably, the portion undergoing molding need not be fully released from the mold. Instead, the portion is retained aligned within the mold nest and only portions of the mold as required to define a further cavity to be injection molded with material are reconfigured. The resulting element is permanently integrated without any mechanical coupling mechanisms, fasteners or assembly requirements. By changing the injection material between metal, dielectric polymer and structural polymers an integral connector element is obtained that is fully assembled upon application of the last layer.

Figure 5:
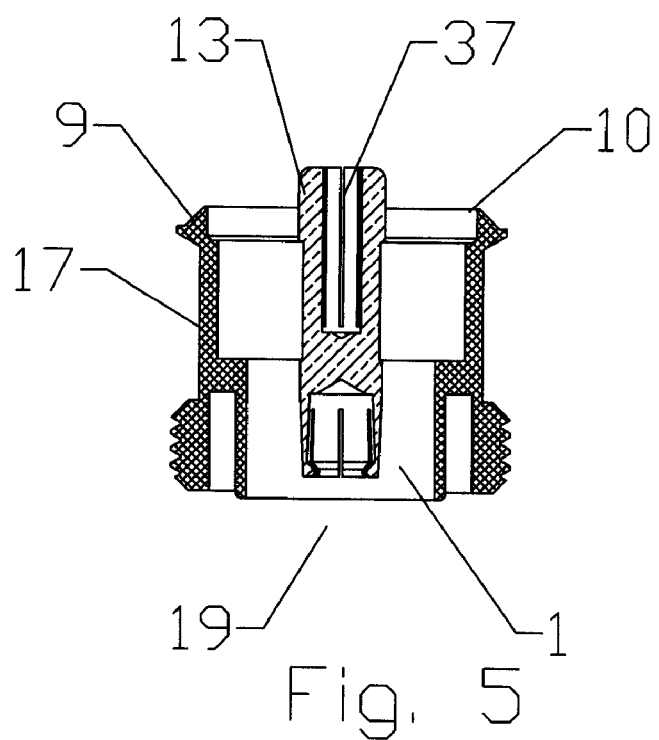
FIG. 5 is a schematic cut-away side view of the conductive sleeve and inner contact of FIG. 1, positioned for injection molding of the dielectric spacer.

In an exemplary method for manufacturing the connector body 7 via multi-shot injection molding, a mold for the conductive sleeve is injected with the injection moldable metal composition, forming the inner body 17 conductive sleeve. An inner portion of the mold is removed and the inner contact 13 positioned therein as shown for example in FIG. 5. Alternatively, the inner contact 13 may be positioned first, and mold portions nested thereupon using the inner contact 13 as an alignment element for the various molding operations.

Figure 6:
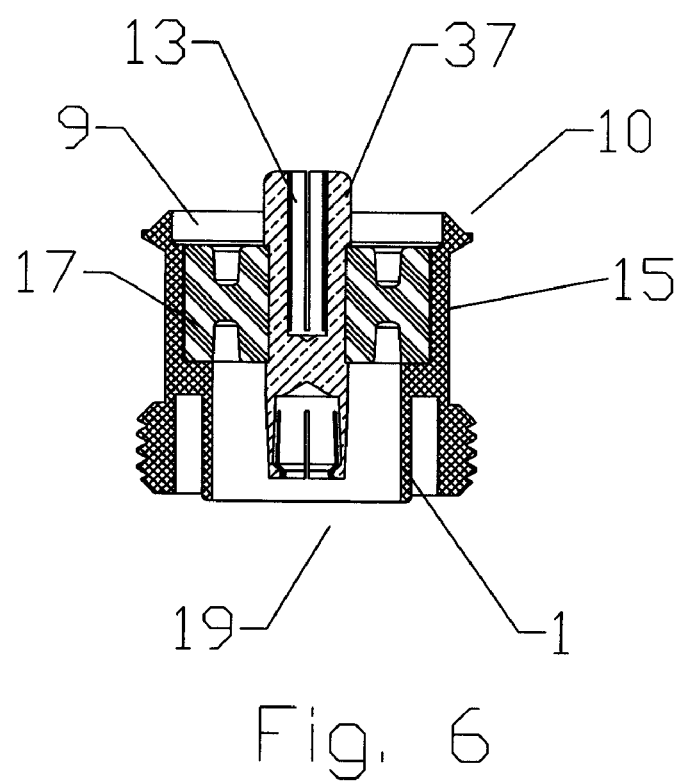
FIG. 6 is a schematic cut-away side view of the conductive sleeve, inner contact and dielectric spacer of FIG. 1.
Figure 7:
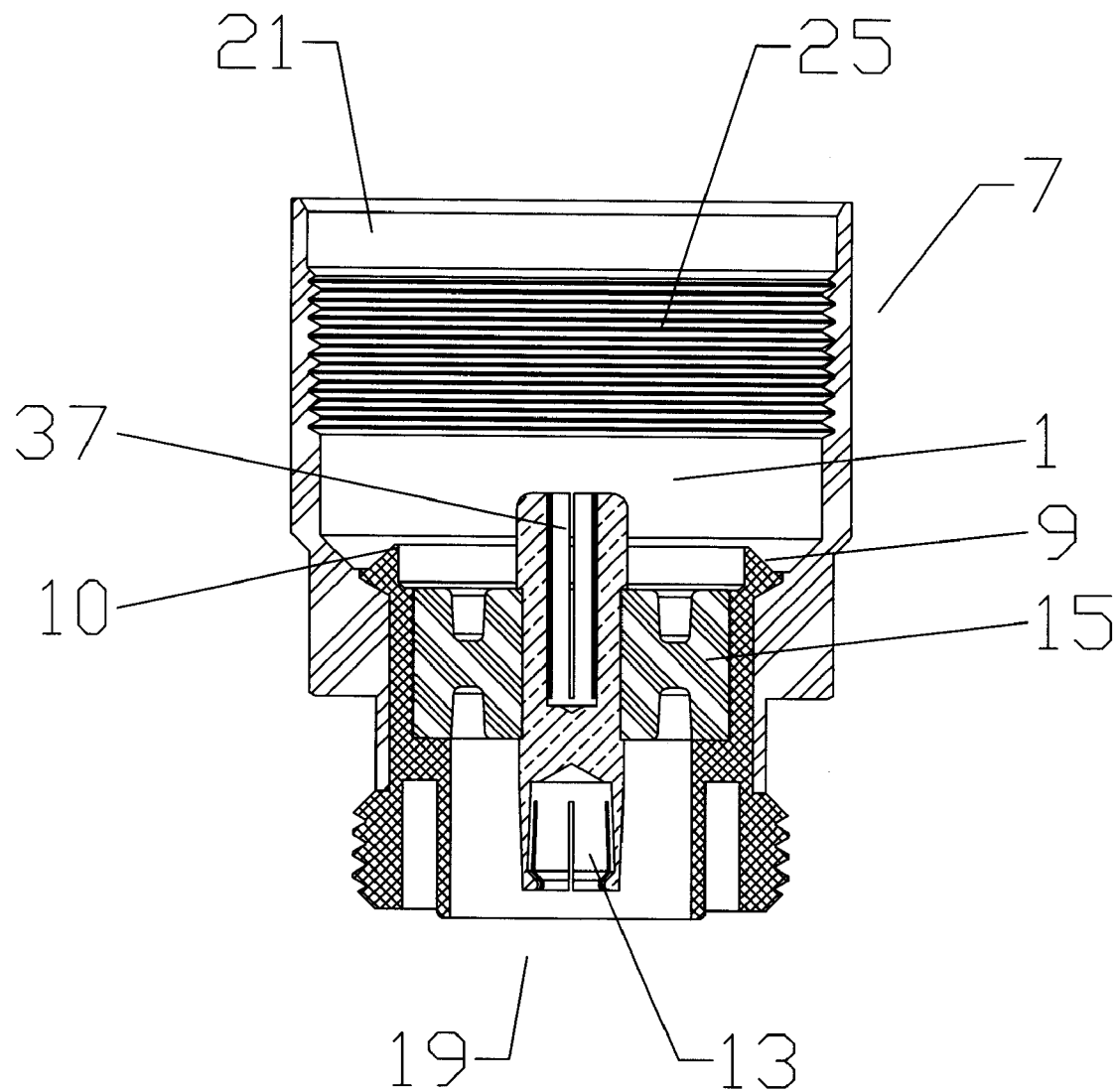
FIG. 7 is a schematic cut-away side view of the multi-shot connector body of FIG. 1.

A space between the inner contact 13 and the inner body 17 is then injected with a dielectric polymer to form the dielectric insulator 15 in situ as shown in FIG. 6. The inner body 17 is also positioned as the core for a molding step wherein a polymer is injected to form the outer body 21 in situ as shown in FIG. 7.

The order of molding is preferably arranged based upon the melting point of the various materials applied with the injection moldable metal composition typically being first, the dielectric polymer second and the outer body 21 polymer last.

Figure 8:
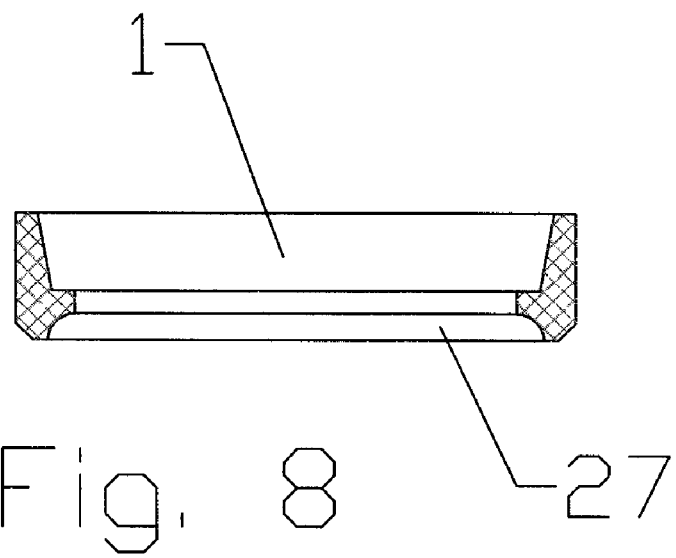
FIG. 8 is a schematic cut-away side view of the slip ring mating surface of FIG. 1.
Figure 9:
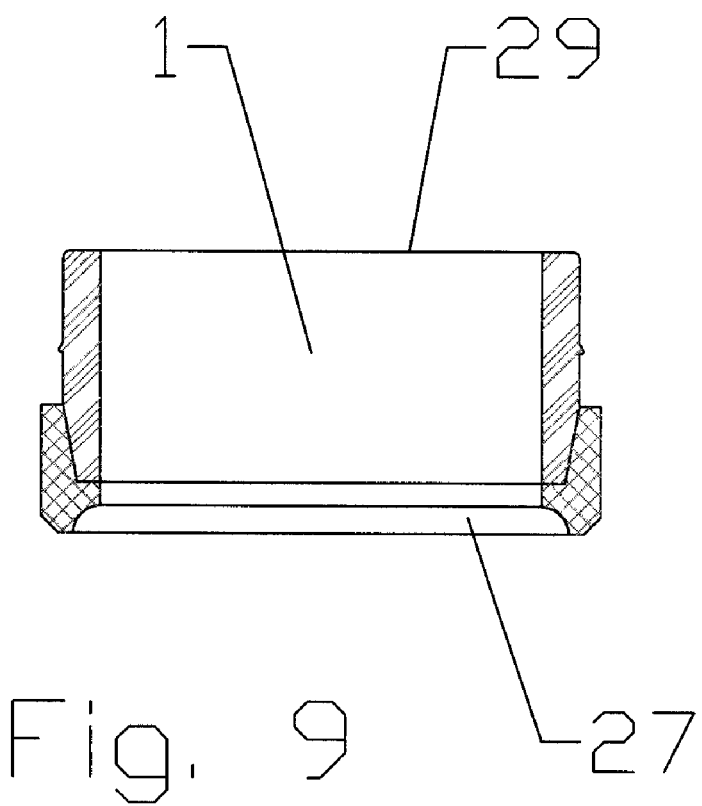
FIG. 9 is a schematic cut-away side view of the slip ring of FIG. 1.

The slip ring mating surface 27, as shown in FIG. 8, may be similarly formed by injecting the injection moldable metal composition into a slip ring mating surface mold, then, if desired, replacing a portion of the mold to form an adjacent cavity for injection of polymeric material to form the slip ring body 29 integral with the slip ring mating surface 27 as shown in FIG. 9.

Figure 10:
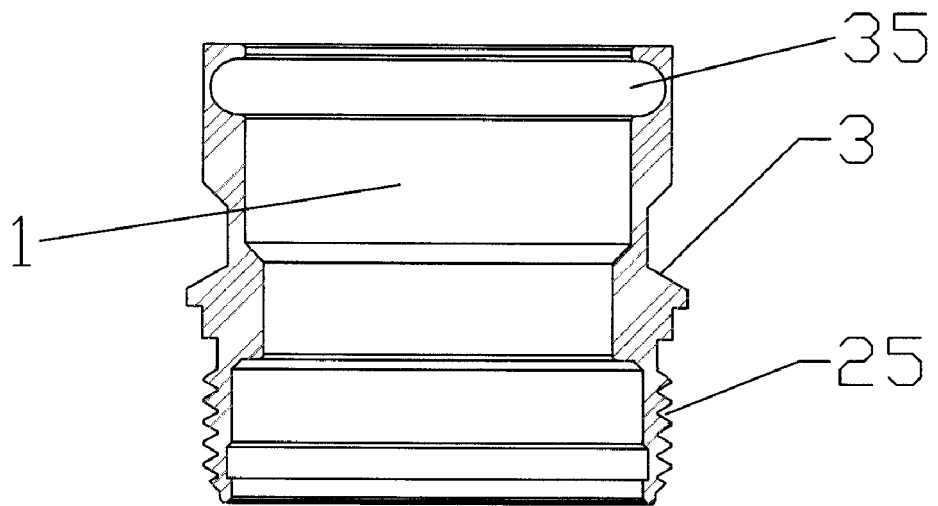
FIG. 10 is a schematic cut-away side view of the coupling body of FIG. 1.
Figure 11:
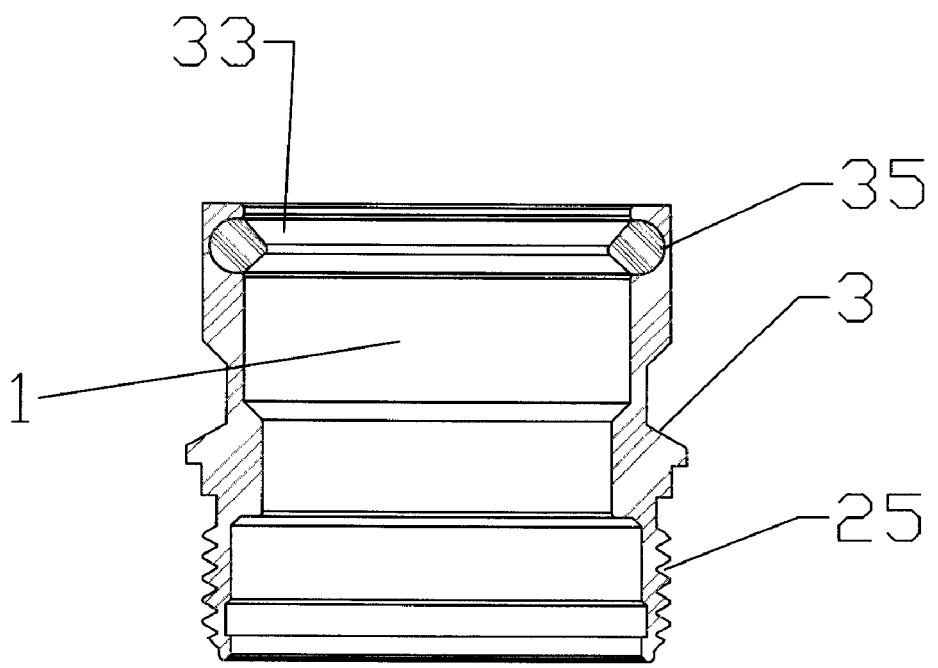
FIG. 11 is a schematic cut-away side view of the coupling body of FIG. 1, including an in situ formed sheath gasket.

The coupling body 3, as shown in FIG. 10, may be formed by injecting a polymer into a coupling body mold. If desired, the coupling body mold may be opened and portions exchanged to form a sheath seal cavity that is then injected with a polymeric gasket material to form the sheath seal 33 in situ, as shown in FIG. 11.

Thereby, the connector is formed in only three main elements that are easily assembled with the desired environmental seal(s) 31, clamp spring 11 and any further connection interface 19 portions to form the connector.

Figure 12:
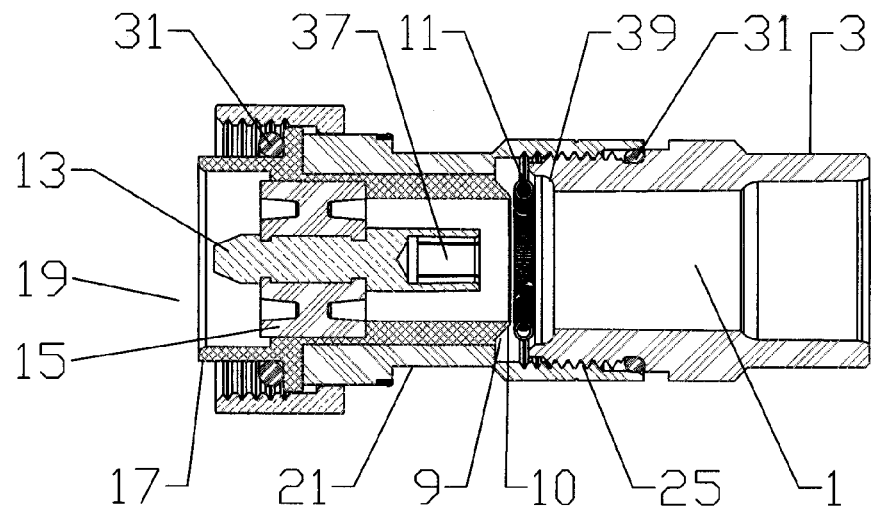
FIG. 12 is a schematic cut-away side view of a third exemplary embodiment.
Figure 13:
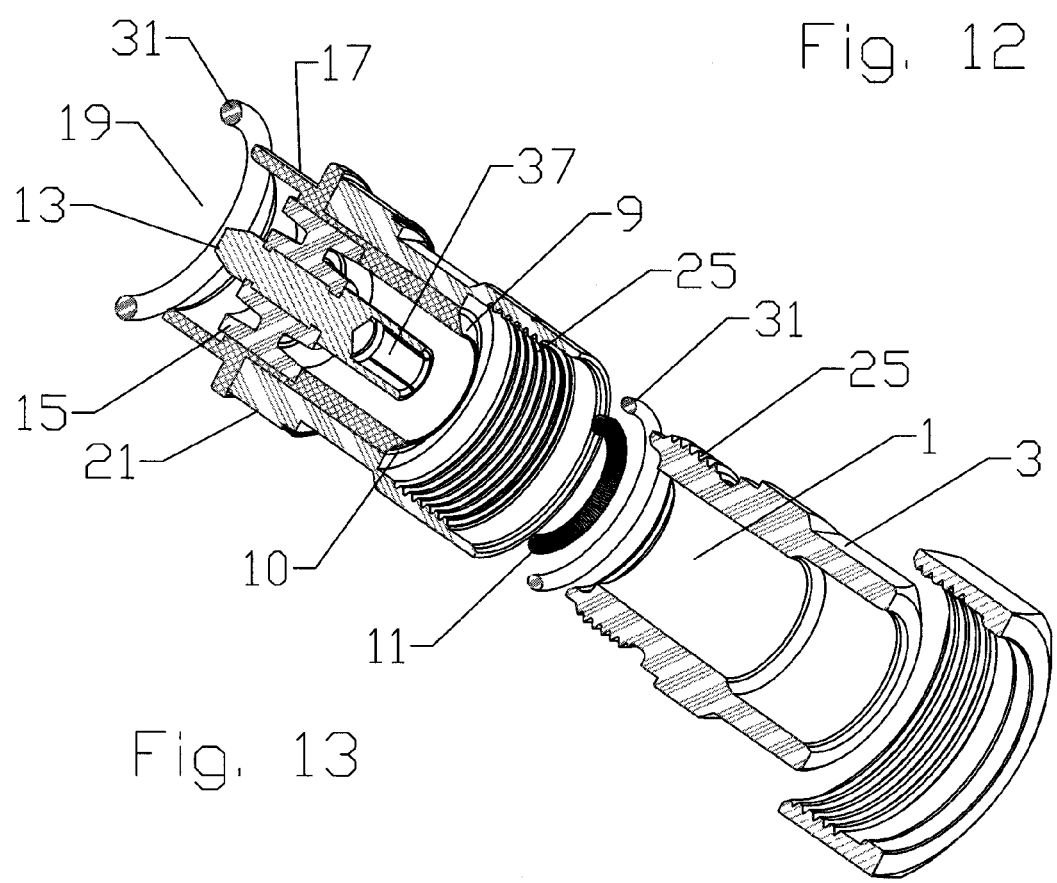
FIG. 13 is a schematic isometric exploded cut-away side view of FIG. 12.
Figure 14:
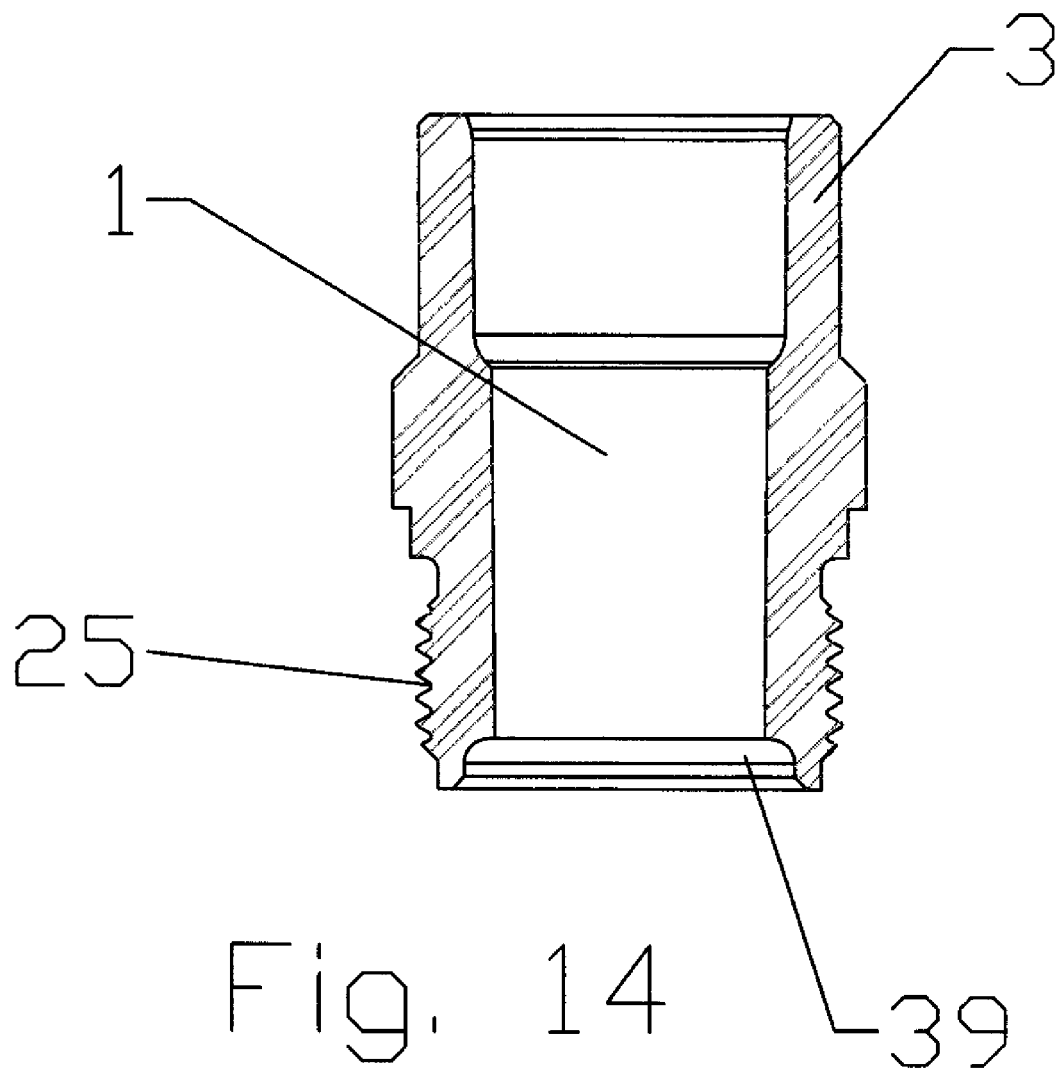
FIG. 14 is a schematic cut-away side view of the coupling body of FIG. 12.

Alternatively, the slip ring 5 may be eliminated by forming the coupling body 3 as a monolithic polymer portion with a clamp ring surface 39 for direct engagement with the clamp spring 11 or the like, as shown for example in FIGS. 12-14.

Figure 15:
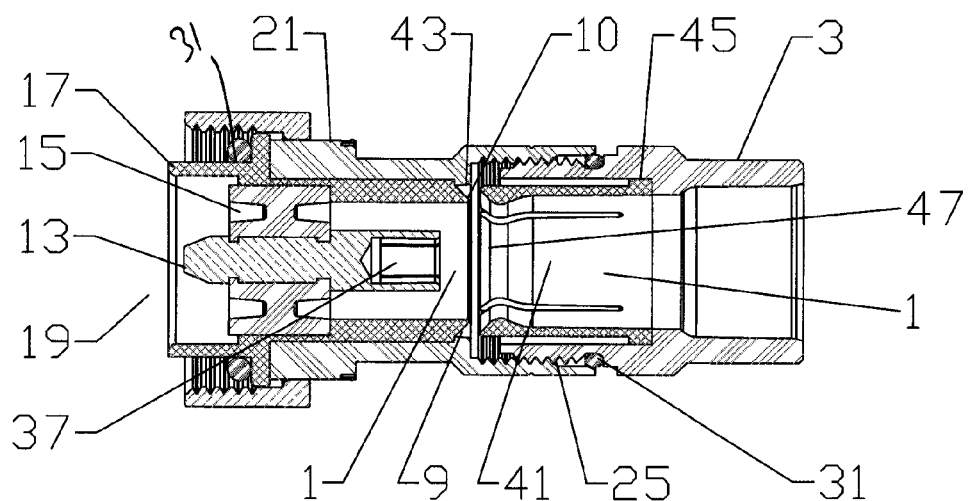
FIG. 15 is a schematic cut-away side view of a fourth exemplary embodiment.
Figure 16:
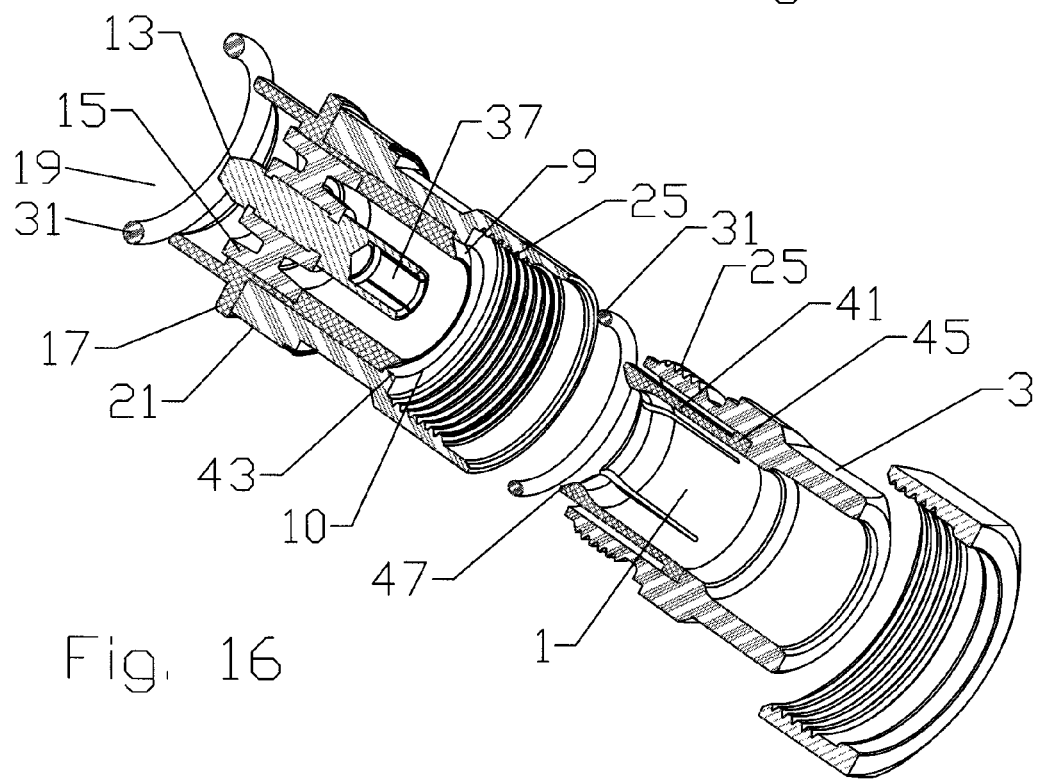
FIG. 16 is a schematic isometric exploded cut-away side view of FIG. 15.
Figure 17:
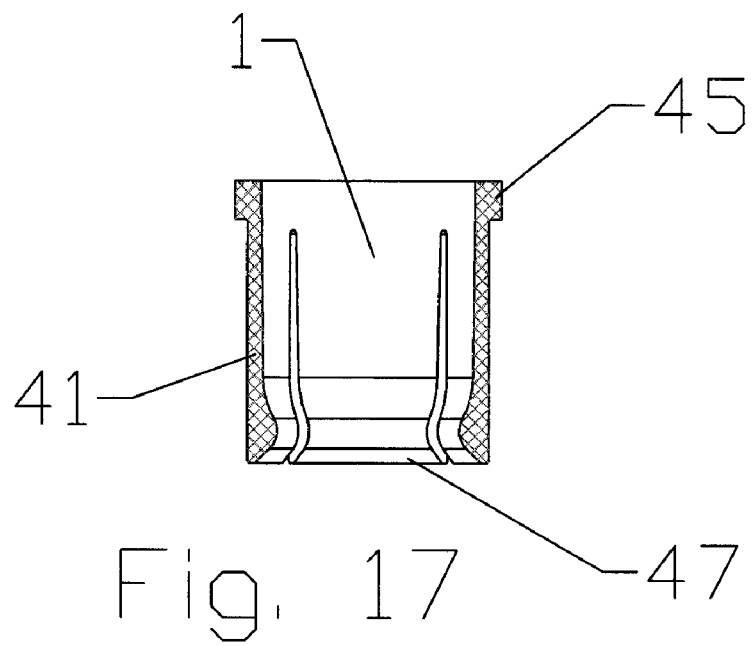
FIG. 17 is a schematic cut-away side view of a spring finger portion of the back body of FIG. 15.
Figure 18:
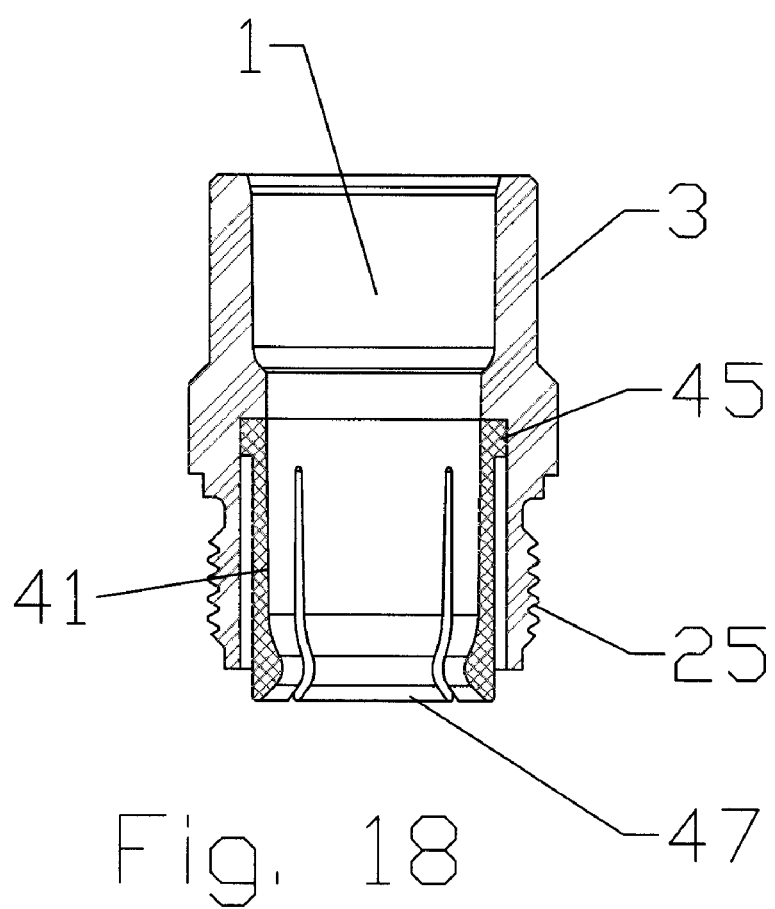
FIG. 18 is a schematic cut-away side view of the back body of FIG. 15.

As shown in FIGS. 15 and 16, additional alternative configurations also eliminate the clamp spring 11 by forming the coupling body 3 with spring finger(s) 41. A representative coupling body and associated connector body 7 retaining lip 43 are disclosed in detail in U.S. patent application Ser. No. 11/672,631, "Annular Corrugated Coaxial Cable Connector with Polymeric Spring Finger Nut" by Jim Wlos, filed Feb. 8, 2007, co-owned with the present application by Commscope, Inc. of North Carolina and hereby incorporated by reference in the entirety. The resulting connector has only two primary elements. To improve strength characteristics of the spring finger(s) 41, a spring finger portion 45 may be first formed from the injection moldable metal composition as shown in FIG. 17, over which the remainder of the coupling body 3 is molded from polymer material, as shown in FIG. 18. Environmental seal(s) 31, for example between the coupling body 3 and the cable outer conductor and or sheath may also be added, as described herein above.

By minimizing the use of metal, the invention provides a significant materials cost and weight savings. By replacing metal machining with injection molding technology, the number of separate sub-elements is significantly reduced, manufacturing is simplified, numerous assembly steps are eliminated and the required skill level(s) of manufacturing personnel are each significantly reduced. Further, because numerous prior elements are multi-shot injection molded directly upon one another, the number of pathways between discrete components is reduced, resulting in a connector with superior long term sealing characteristics requiring fewer environmental seals.

| Table of Parts | |
|---|---|
| 1 | bore |
| 3 | coupling body |
| 5 | slip ring |
| 7 | connector body |
| 9 | annular ramp surface |
| 10 | end face |
| 11 | clamp spring |
| 13 | inner contact |
| 15 | dielectric insulator |
| 17 | inner body |
| 19 | connection interface |
| 21 | outer body |
| 23 | tool flat |
| 25 | threads |
| 27 | spring mating surface |
| 29 | slip ring body |
| 31 | environmental seal |
| 33 | sheath seal |
| 35 | annular groove |
| 37 | spring basket |
| 39 | clamp ring surface |
| 41 | spring finger |
| 43 | retaining lip |
| 45 | spring finger portion |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A coaxial cable connector, comprising:
    a connector body multi-shot injection molded about an inner contact; the connector body comprising:
        a dielectric insulator of dielectric polymer molded upon an outer diameter of the inner contact;
        a coaxial inner body of injectable molded metal composition molded upon an outer diameter of the dielectric spacer; and
        an outer body of polymer injection molded upon an outer diameter of the inner body.

2. The coaxial cable connector of claim 1, further including:
    a polymeric coupling body threadably coupled to the outer body.

3. The coaxial cable connector of claim 1, further including:
    an annular ramp surface formed on an end face of the inner body,
    a generally cylindrical slip ring positioned within a bore of the connector body,
    a clamp spring positioned between the annular ramp surface and the slip ring, and
    a polymeric coupling body threadably coupled to the outer body operative to drive the slip ring against the clamp spring.

4. The coaxial connector of claim 1, further including:
    an annular ramp surface formed on an end face of the inner body,
    a clamp spring positioned between the annular ramp surface: and
    a polymeric coupling body threadably coupled to the outer body operative to drive the clamp spring towards the annular ramp surface.

5. The coaxial connector of claim 1, further including:
    an annular ramp surface on an end face of the inner body;
    a retaining lip on an inner diameter sidewall of the outer body proximate the annular ramp surface; and
    a polymeric coupling body threadably coupled to the outer body;
    the polymeric coupling body molded upon a spring finger portion of injectable molded metal composition; a plurality of spring fingers of the spring finger portion projecting towards the annular ramp surface; wherein threading of the polymeric coupling body into the connector body drives a distal end of the spring fingers towards the annular ramp surface.

6. The coaxial connector of claim 1, wherein the injectable molded metal composition is an alloy comprising zinc and aluminum.

7. A method for manufacturing a multi-shot injection molded coaxial cable connector, comprising the steps of:
    injection molding an inner body of injectable molded metal composition;
    positioning an inner contact coaxial within a bore of the inner body,
    injection molding a dielectric insulator between the inner body and the inner contact, and
    injection molding an outer body of polymer upon an outer diameter surface of the inner body.

8. The method of claim 7, further comprising injection molding a slip ring comprising:
    a slip ring mating surface of injectable molded metal composition;
    injection molding a polymer slip ring body onto the slip ring mating surface;

injection molding a coupling body; and threadably coupling the coupling body to the outer body, retaining the slip ring between the inner body and the coupling body.

9. The method of claim 7, further comprising injection molding a polymer coupling body; and threadably coupling the coupling body to the outer body.

10. The method of claim 7, wherein the coupling body comprises a spring finger portion injection molded of an injectable molded metal composition; and wherein the method further comprises injection molding a polymer about the spring finger portion.

11. The method of claim 7, further including injection molding a coupling nut provided with a clamp ring surface; and wherein the inner body is provided with an annular ramp surface at an end face;

the coupling nut threadable into the outer body and drives the clamp ring surface towards the annular ramp surface.

12. The method of claim 7, wherein the injection molded metal composition is an alloy comprising aluminum and zinc.

13. The method of claim 7, wherein the injection molding is performed at a temperature of 1100 degrees Fahrenheit or less.

14. A method for manufacturing a multi-shot injection molded coaxial cable connector, comprising the steps of:
    inserting an inner contact into a mold;
    injection molding an inner body of injectable molded metal composition;
    injection molding a dielectric insulator between the inner contact and the inner body;
    injection molding an outer body of polymer upon an outer diameter surface of the inner body.

15. The method of claim 14, further comprising injection molding a slip ring comprising:
    a slip ring mating surface of injectable molded metal composition;
    injection molding a polymer slip ring body onto the slip ring mating surface;
injection molding a coupling body; and
threading the coupling body into the connector body, retaining the slip ring between the coupling body and the connector body.

16. The method of claim 14, further comprising injection molding a polymer coupling body; and threadably coupling the coupling body to the outer body.

17. The method of claim 16, wherein the coupling body comprises a spring finger portion injection molded of an injectable molded metal composition; and the method further comprises injection molding a polymer about the spring finger portion.

18. The method of claim 14, further including injection molding a coupling nut provided with a clamp ring surface; and the inner body is provided with an annular ramp surface at an end face;

the coupling nut threadable into the outer body, to drive the clamp ring surface towards the annular ramp surface.

19. The method of claim 14, wherein the injection molded metal composition is an alloy comprising aluminum and zinc.

20. The method of claim 14, wherein the injection molding is performed at a temperature of 1100 degrees Fahrenheit or less.

* * * * *